United States Patent [19]

Fletcher et al.

[11] 4,043,674
[45] Aug. 23, 1977

[54] SPATIAL FILTER FOR Q-SWITCHED LASERS

[76] Inventors: James C. Fletcher, Administrator of the National Aeronautics and Space Administration, with respect to an invention of; Ralph F. Wuerker, Palos Verdes Estates; Lee O. Heflinger, Torrance, both of Calif.

[21] Appl. No.: 511,334

[22] Filed: Oct. 2, 1974

[51] Int. Cl.[2] .................................................. G02B 27/00
[52] U.S. Cl. .................................................. 350/162 SF
[58] Field of Search ........................... 350/162 SF, 3.5

[56] References Cited

U.S. PATENT DOCUMENTS

| | | | |
|---|---|---|---|
| 3,704,053 | 11/1972 | Farmer | 350/162 SF |
| 3,852,767 | 12/1974 | Brooks | 350/3.5 |
| 3,868,637 | 2/1975 | Schiller | 350/162 SF |

*Primary Examiner*—Jon W. Henry
*Attorney, Agent, or Firm*—N. T. Musial; J. A. Mackin; John R. Manning

[57] ABSTRACT

A spatial filtered Q-switched laser system is disclosed having means to prevent ionization of air in close proximity to the aperture of the spatial filter. A compound lens system having an astigmatic focus is disposed between the laser and the spatial filter for defocusing the light beam emanating from the laser in the vicinity of the aperture of the spatial filter to an intensity below that which produces ionization of air. The preferred construction of the compound lens system as viewed from the laser comprises a cylindrical lens and a pair of positive lenses.

3 Claims, 2 Drawing Figures

SPATIAL FILTER FOR Q-SWITCHED LASERS

ORIGIN OF THE INVENTION

The invention described herein was made under contract with the U.S. Government and may be manufactured and used by or for the Government for governmental purposes without the payment of any royalties thereon or therefor.

BACKGROUND OF THE INVENTION

The invention relates to Q-switched laser systems having spatial filtering of light beams emanating from the laser. More particularly, the invention relates to laser systems of the aforementioned type which have means to prevent ionization of the air in close proximity to the aperture of the spatial filter.

DESCRIPTION OF THE PRIOR ART

U.S. Pat. Nos. 3,415,587; 3,451,755 and 3,704,053 each disclose the use of spatial filters in laser systems. However, none of these aforementioned inventions relates to Q-switched laser systems having spatial filtering and means to prevent ionization of air in close proximity to the aperture of the spatial filter.

SUMMARY OF THE INVENTION

The disadvantages and limitations of prior art Q-switched laser systems having spatial filtering are obviated by the present invention which provides means for preventing ionization of air in close proximity to the aperture of the spatial filter.

A Q-switched laser system constructed according to the present invention comprises a laser light source which emanates light along an optical path in which is disposed the aperture of a spatial filter. Means are provided fro preventing the ionization of the air in close proximity to the aperture of the spatial filter. Preferably, this means comprises a compound lens system which, when viewed from the laser light source, consists of a cylindrical lens having finite and infinite focal lengths and a pair of positive lens having finite focal lengths. This compound lens system produces an astingmatic focus in close proximity to the aperture of the spatial filter to lessen the intensity of the optical fields in this area below the intensity which produces ionization of air.

DETAILED DESCRIPTION OF THE INVENTION

Figure 1:
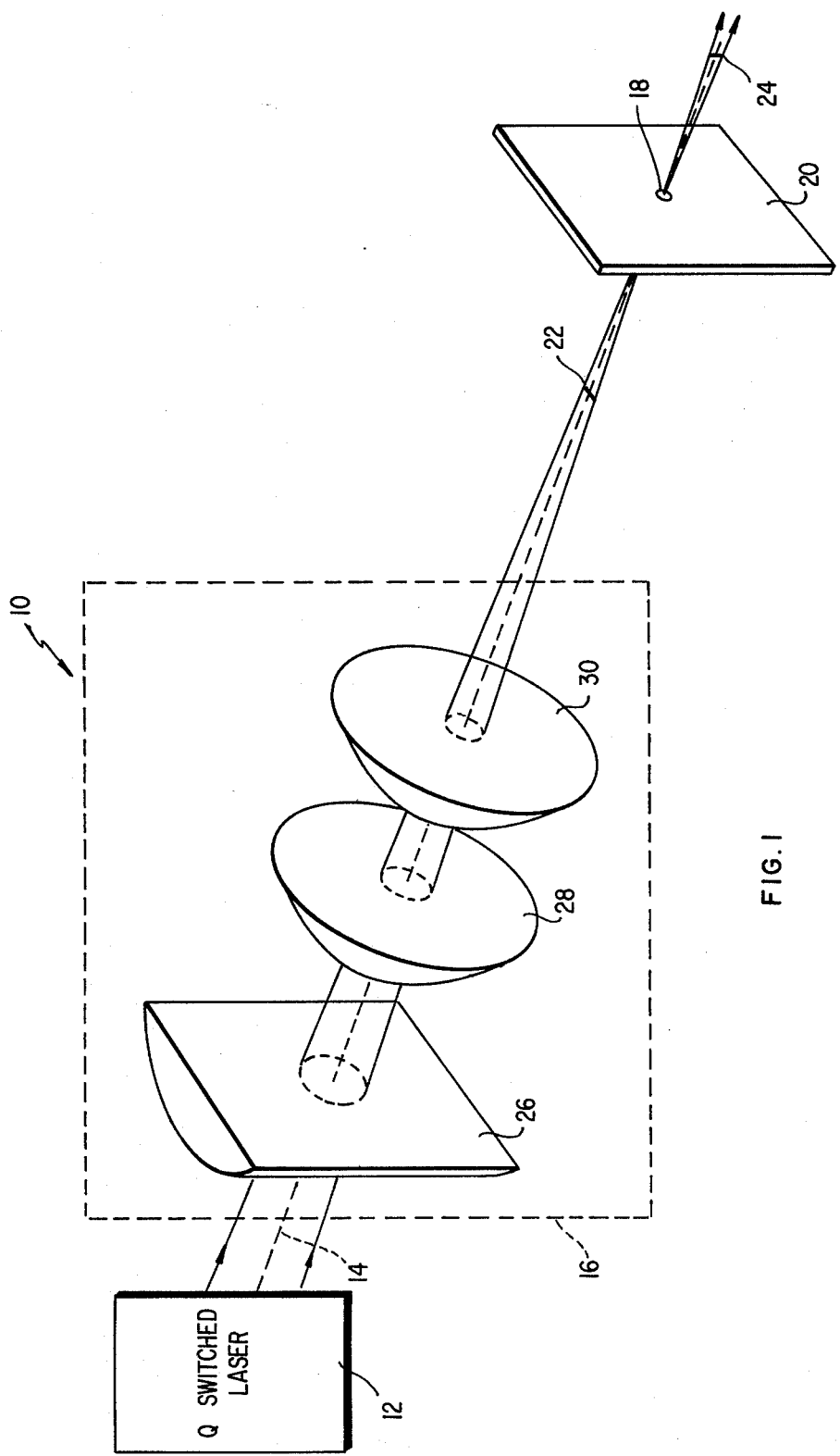
FIG. 1 is a view showing a Q-switched laser system having spatial filtering that is constructed according to the present invention.

Referring in detail to the drawing, a Q-switched laser system 10 with spatial filtering constructed according to the invention includes a conventional Q-switched laser 12 which periodically emits high intensity bursts of light 14 which travel along an optical path which passes through a compound lens system 16 (which is enclosed by dotted lines) and through aperture 18 of spatial filter 20. In prior art Q-switched laser systems having spatial filtering, the extremely high intensity short bursts of light emanated by laser 12 produced ionization of the air in the vicinity of aperture 18 when bursts 14 were focused precisely at the aperture 18 of spatial filter 20. Compound lens system 16 comprises means disposed in the optical path between Q-switched laser 12 and the spatial filter 20 for producing an astigmatic focus in the proximity of aperture 18 of the light bursts emanating from laser 12. The terminology astigmatic focus in terms of the specification and appended claims is meant to define the condition produced by a lens system in which light is focused at two precise different focal lines within the optical path of the light transmitted by the lens system. With reference to FIG. 1, numerals 22 and 24 identify the aforementioned different focal lines. The production of the astigmatic focus identified by numerals 22 and 24 lessens the intensity of the optical field in close proximity to aperture 18 to a level below that which causes ionization of air.

Figure 2:
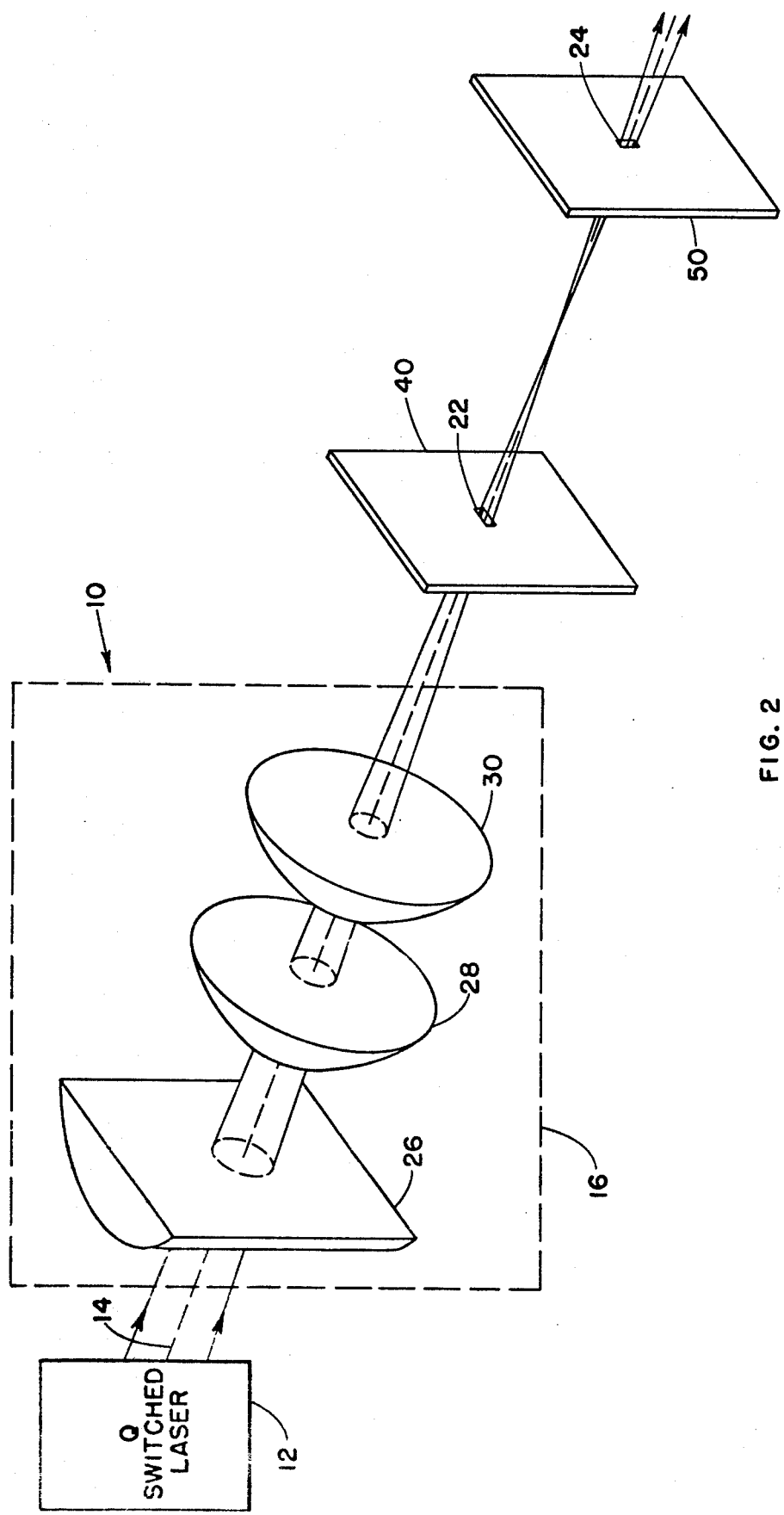
FIG. 2 shows the system of FIG. 1 modified with respect to the spatial filter.

While the preferred embodiment shown consists of a circular aperture 18, midway between the focal lines 22 and 24, it should be apparent to those skilled in the art that the circular aperture 18 may be replaced by two slit apertures in filter plates 40 and 50 at the focal lines 22 and 24, respectively, as shown in FIG. 2. Such a double slit aperture permits greater selectivity in the spatial filter but requires more precise alignment.

The preferred construction of compound lens system 16, which is disposed in the optical path of the light 14 emanated by laser 12, comprises, when viewed from laser 12, a cylindrical lens having a finite and infinite focal length and a pair of positive lenses each having finite focal lengths. The positive lenses 28 and 30 focus the rays passing through cylindrical lens 26 which have a finite focal length at point 22 and focus the rays passing through cylindrical lens 26 which have an infinite focal length at point 24.

While in the preferred embodiment, compound lens system 16 is comprised of a cylindrical lens and two positive lenses, it should be apparent to those skilled in the art that other equivalent lens systems producing an astigmatic focus can be used with equal facility in the present invention without departing from the spirit and scope thereof.

What we claim is:

1. A Q-switched laser system comprising:
   a. a Q-switched laser emanating a beam of light along an optical path,
   b. means disposed in said optical path for producing an astigmatic focus of said beam of light wherein said beam is focused on a first line traverse to said beam at a first position along said beam and is focused on a second line traverse to said beam and perpendicular to said first line at a second position along said beam, and
   c. a spatial filter comprising a first light-opaque plate having a slit therein and disposed traversely to said beam at said first position, said slit being substantially in register with said first line and a second light-opaque plate having a slit therein and disposed traversely to said beam at said second position, said slit of said second plate being substantially in register with said second line.

2. The laser system of claim 1 wherein said means comprises:
   a. a compound lens system.

3. In a laser system as recited in claim 2 wherein said compound lens system comprises when viewed from said laser:
   a. a cylindrical lens having two focal lengths, said first focal length being finite and said second focal length being infinite; and
   b. a pair of positive lenses each having a finite focal length.

* * * * *